United States Patent [19]

Boyd

[11] B 3,987,415

[45] Oct. 19, 1976

[54] DETERMINATION AND PRINTOUT OF REFERENCE LINE

[75] Inventor: William Weller Boyd, Austin, Tex.

[73] Assignee: International Business Machines Corporation, Armonk, N.Y.

[22] Filed: Dec. 26, 1973

[21] Appl. No.: 428,271

[44] Published under the second Trial Voluntary Protest Program on March 23, 1976 as document No. B 428,271.

[52] U.S. Cl. .......... 340/172.5
[51] Int. Cl.² .......... G06F 3/12
[58] Field of Search .......... 340/172.5; 445/1

[56] References Cited

UNITED STATES PATENTS

| | | | |
|---|---|---|---|
| 3,618,032 | 11/1971 | Goldsberry et al. | 340/172.5 |
| 3,706,075 | 12/1972 | Fredrickson et al. | 340/172.5 |
| 3,755,784 | 8/1973 | Greek, Jr. et al. | 340/172.5 |
| 3,764,986 | 10/1973 | Spademan et al. | 340/172.5 |
| 3,772,655 | 11/1973 | Bluethman et al. | 340/172.5 |

OTHER PUBLICATIONS

"Preparing Media for Unattended Printing"-IBM Technical Disclosure Bulletin-vol. 14, No. 7, 12/71; p. 2105; W. F. Rogers.

*Primary Examiner*—Harvey E. Springborn
*Attorney, Agent, or Firm*—John L. Jackson; Douglas H. Lefeve

[57] ABSTRACT

In the IBM Mag Card II, data read from the cards into the shift register buffer can be scanned without printing the data out and rerecorded on a magnetic card with proper pagination decisions made based on an operator entered line count. A system is provided for printing out a reference line near the end of each page based on the operator entered line count such that the operator can determine that the page has ended at a proper point. In addition, the system provides a control technique such that when a sufficient number of lines have been scanned to satisfy the line count, the reference print line will neither be the next to the last line of a paragraph nor the first line of a paragraph. This control is in accordance with established word processing procedures in that it is undesirable to end the page with the first line of a paragraph or to begin a subsequent page with the last line of a paragraph. Logic is provided to accomplish this printout in accordance with the above rules.

11 Claims, 36 Drawing Figures

FIG. 5a
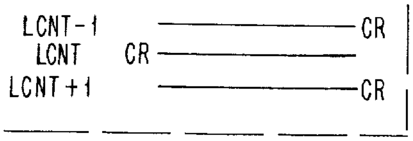
FIG. 5b
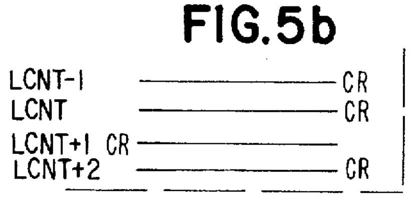
FIG. 5c
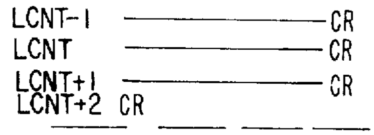
FIG. 5d
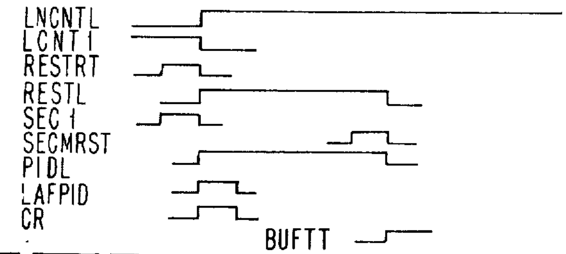
FIG. 5e
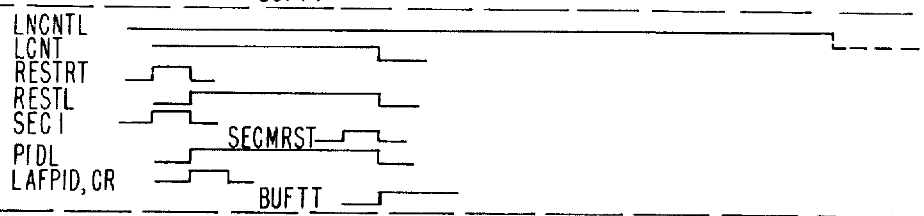
FIG. 5f
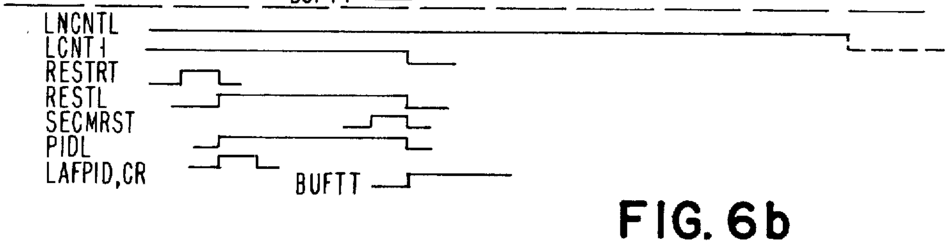
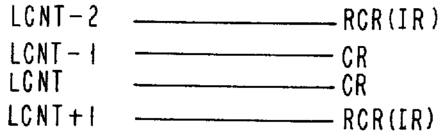
FIG. 6a
FIG. 6b
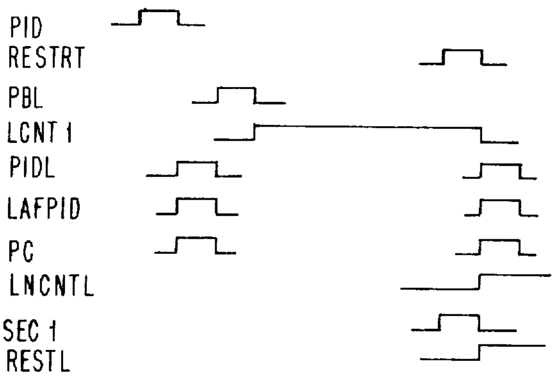
FIG. 7a
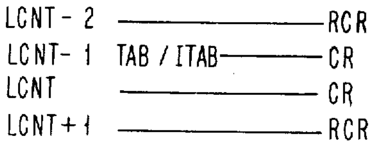
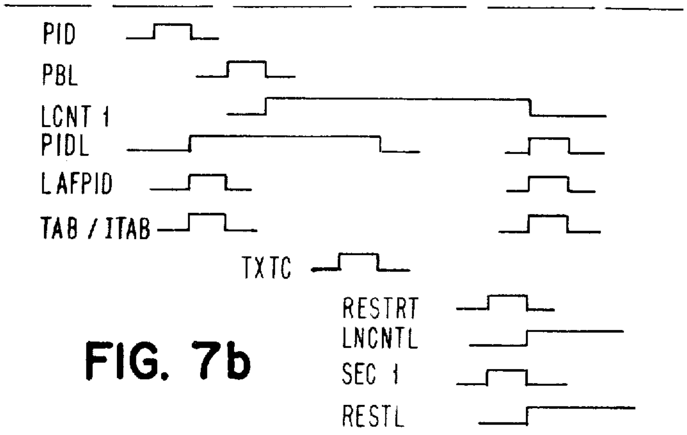
FIG. 7b FIG. 8a
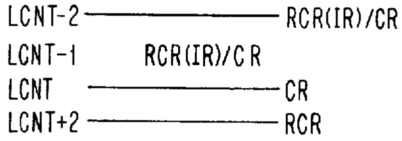
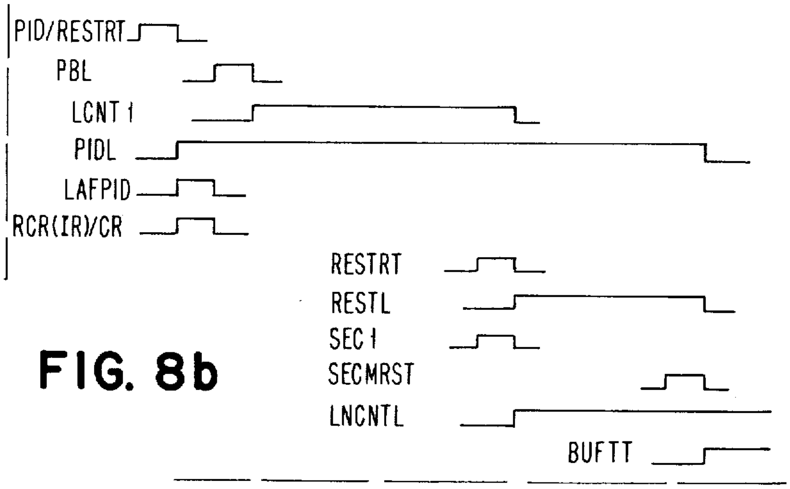
FIG. 8b
FIG. 9a
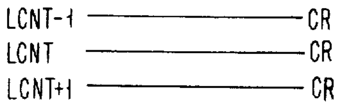
FIG. 9b
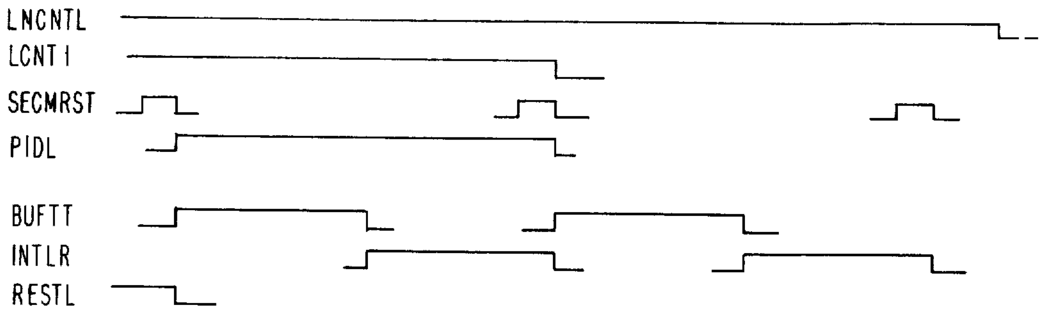
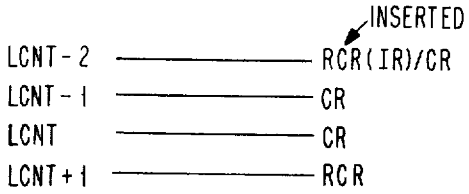
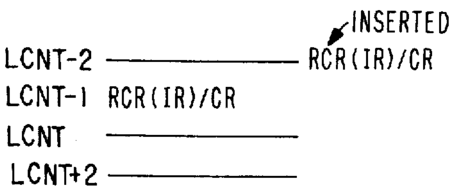
FIG. 10a
FIG. 10b

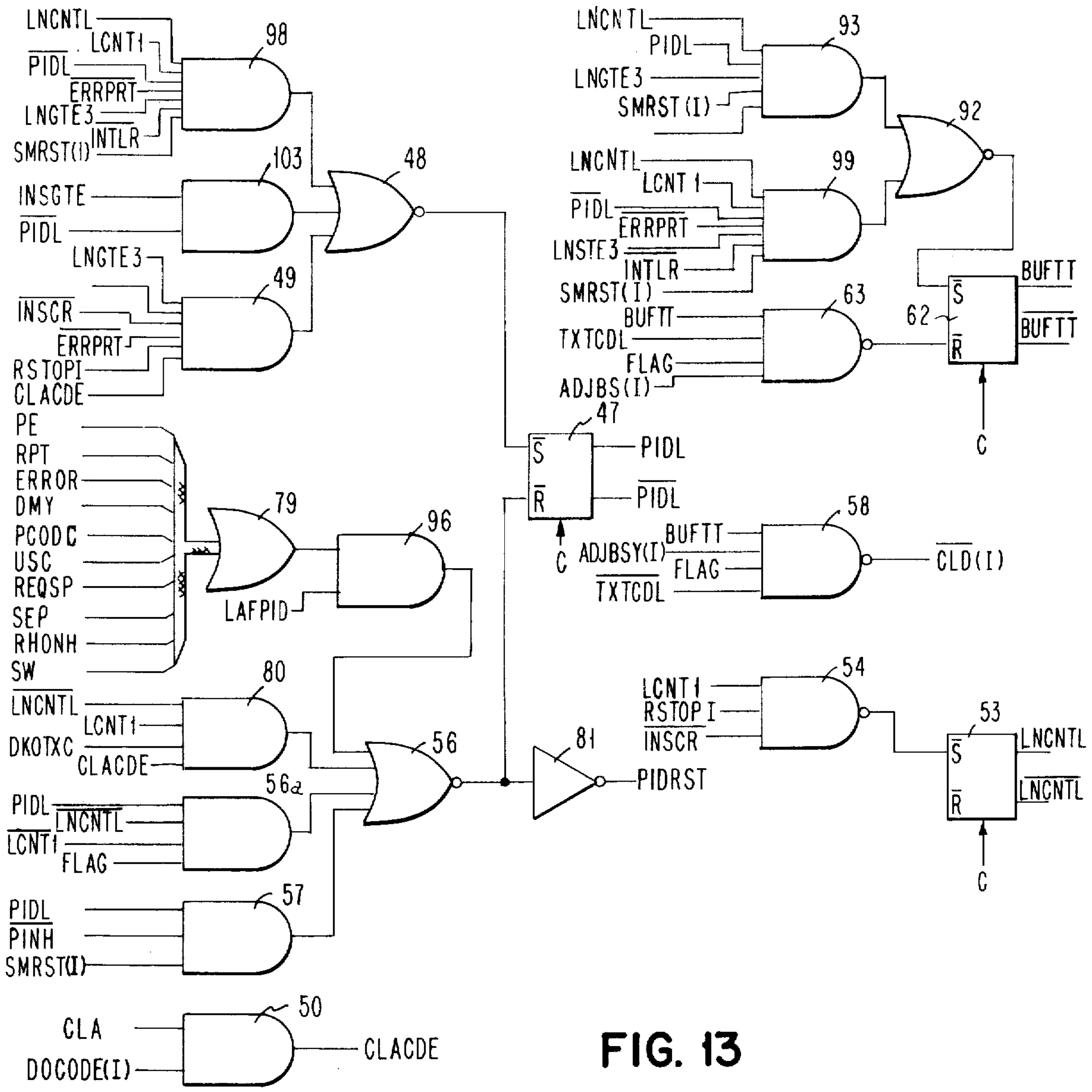
FIG. 13
FIG. 15
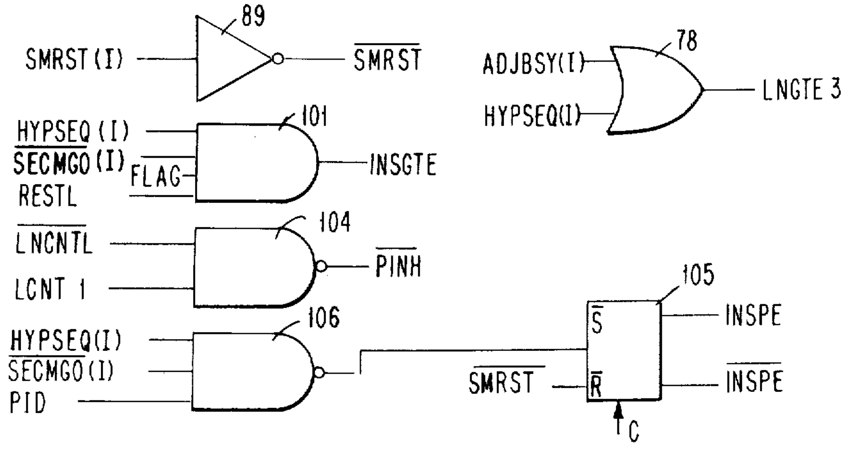

DETERMINATION AND PRINTOUT OF REFERENCE LINE

CROSS-REFERENCE TO RELATED APPLICATIONS

"Margin Adjusting of Textual Codes in a Memory," Ser. No. 595,637, filed July 14, 1975, to Boyd, assigned to the assignee of the present application, which is a continuation of "Margin Adjusting of Textual Codes in a Memory," Ser. No. 428,274, filed Dec. 26, 1973, to Boyd, assigned to the assignee of the present application, now abandoned. This application discloses the internal adjust logic which is utilized to accomplish the silent scanning of a page or, if desired, the scanning of a page while in the print mode to adjust line endings to accommodate changes made by the operator to the data in the memory.

"System for Unattended Printing," Ser. No. 428,273, filed Dec. 26, 1973, to William W. Boyd, assigned to the assignee of the present invention. This application teaches a system for unattended printing in which in the usual case cards which have already been recorded with proper pagination decisions made are automatically printed out without need for operator intervention.

BACKGROUND OF THE INVENTION

1. Field of the Invention

This invention relates to the field of wood processing in general, and more particularly, to a system in which data in a memory is scanned in a silent manner without printout and an operator reference line is printed out for operator utilization along with systems control for preventing the printed out line from being the next to last line of a paragraph or the first line of a paragraph.

2. Description of the Prior Art

In all previously known word processing machines such as the IBM Magnetic Tape "Selectric" Typewriter and the IBM Mag Card "Selectric" Typewriter, when lines are to be adjusted, the printer is hot. That is, the printer is printing while the length of the lines are adjusted to accommodate corrections made to the draft by the reviewer. Since the scan of the text was limited by the speed of the printer it was desirable to provide a more rapid means of scanning the text. In addition, since the printer was hot during the scanning or adjusting of the text, the printer contributed a significant amount of noise which is undesirable where a number of printers are located in a single room as is the trend in the industry. Thus, it was desirable to provide a system wherein the scanning of data for the "Selectric", Registered Trademark, International Business Machines Corporation purposes of making pagination decisions could be done electronically without the printer being operated. In this type of scanning system, however, the operator still needs to know where the pagination endings are made. Thus, in the present system there is provided a print out of a proposed last line for observation by the operator. The count of this proposed last line corresponds approximately to the count entered in the system by the operator. This line, however, does not in all cases exactly correspond to the line count entered since there is implemented, in accordance with accepted word processing rules, systems logic such that the line printed out will neither be the next to last line of a paragraph nor the first line of a paragraph, since a page should not end with the first line of a paragraph, nor should a subsequent page begin with the last line of a paragraph.

SUMMARY OF THE INVENTION

In the IBM Mag Card II system, announced Apr. 26, 1973, there are the capabilities of (1) reading a card, which is initiated by depressing a read key, (2) entering data into and clearing the shift register memory, which includes primary and alternate sections, and (3) playing text from either memory section. The data flow in the system in the print mode is from a card read/-recorder through a shift register memory to operate the printer. Data flow during a record operation is from the keyboard through the shift register memory and onto the magnetic card in the recording area of the read/-recorder mechanism. The system includes a read/-recorder mechanism which will hold fifty cards. In the present reference line printout technique, the above capabilities of the IBM Mag Card II will be utilized. In addition to the silent scan logic which is activated by depressing a scan key which causes the shift register memory to be scanned to adjust lines to the desired length in the event that they have not been adjusted, and in the event that they are adjusted, logic is provided in the present invention to print out a reference line in accordance with accepted word processing rules.

In operation, the page count of the number of lines per page is entered into a storage register with the magnetic cards having data thereon to be scanned inserted into the hopper. The first card is fed from the hopper and as soon as the first read character is in the memory, the auto secondary mode is automatically activated by the unattended printing logic described in the aforementioned unattended printing application. The line end counter is incremented at the playout of each line ending character. The text in the shift register memory is continually scanned and line adjustments are made without playout except that if the data has not already been adjusted, playout of words which require hyphenation decisions is made in accordance with the teachings contained in the other referenced application, "Margin Adjusting of Textual Codes in a Memory". When the number of line endings equals the count entered in the system by the operator, the scanning of the lines is terminated and a decision is made as to which line is to be played out for reference purposes by the operator. Logic is provided to prevent the reference line that is being played out from being the next to last line of a paragraph or the first line of a paragraph to conform with the above discussed word processing page ending rules.

BRIEF DESCRIPTION OF THE DRAWINGS

FIGS. 4a-f, 5a-f, 6a-b, 7a-b, 8a-b, 9a-b, 10a-c and 11a-e provide examples of problems encountered in developing a page end control logic system along with timing diagrams representing the timing of certain signals to overcome each of the problems described. These timing diagram signals are tied into the hardware logic provided in FIGS. 12 - 15;

FIGS. 12 – 15 illustrate one embodiment of a hardware system to accomplish the proper reference line printout of the present invention.

DESCRIPTION OF THE PREFERRED EMBODIMENT

Figure 1:
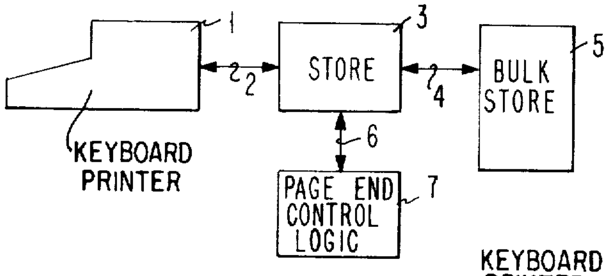
FIG. 1 is an overall pictorial representation of a page end control logic system.

For a more detailed description of the invention, refer first to FIG. 1 wherein there is shown an overall generalized block diagram of the system. As shown in FIG. 1, a keyboard printer 1 is in two way communication along a cable 2 with a store 3. The store 3 is in two way communication along cable 4 with a bulk store 5. The store 3 is also in two way communication along cable 6 with page end control logic 7.

Figure 2:
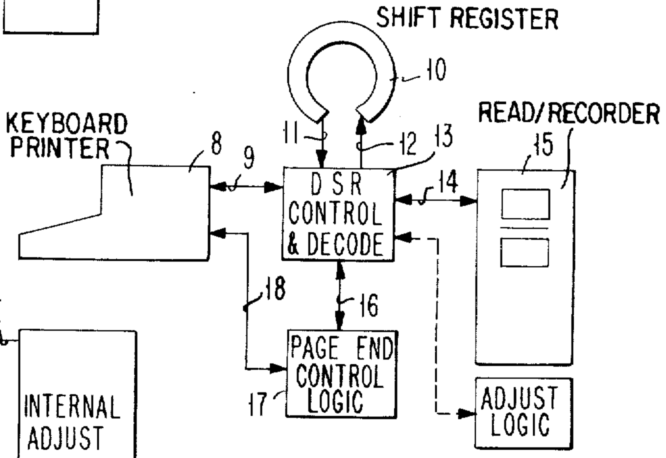
FIG. 2 is a pictorial representation of the IBM Mag Card II system and data flow.

In FIG. 2 there is shown a pictorial representation of the IBM Mag Card II system and data flow. The keyboard printer 8 is in two way communication along cable 9 with the DSR control and decode 13. The DSR control and decode 13 inputs data along line 12 to a shift register 10 which has its output applied along cable 11 back through and into the DSR control and decode 13. The DSR control and decode 13 along with the shift register 10 are described in detail in U.S. Pat. No. 3,675,216, Ser. No. 104,888, filed Jan. 1, 1971, entitled "No Clock Shift Register and Control Technique," having Randell L. James as inventor, and assigned to the assignee of this invention. The DSR control and decode 13 is also in two way communication along line 14 with the mag card read/recorder 15. Likewise, the DSR control and decode 13 is, as shown, in two way communication along cable 16 with the page end control logic 17 which, in turn, is in two way communication along cable 18 with the keyboard printer 8.

While in the preferred embodiment, above-described IBM Mag Card II will be utilized as the host system, utilizing the page end control logic, it will be realized that the storage means associated with this invention need not be a dynamic shift register and the bulk storage means need not be the mag card read/recorder of the Mag Card II. That is, the working storage means may be any type of memory in which the data can be sequentially presented at a read out port for decoding and can, in fact, be a random access memory which is addressed in a sequential manner to present the output of the various memory locations in the memory output register. In addition, the bulk storage means need not be a stack of magnetic cards as is used in the IBM Mag Card II system, but instead may be any type of tape or disc type bulk memory.

Figure 3:
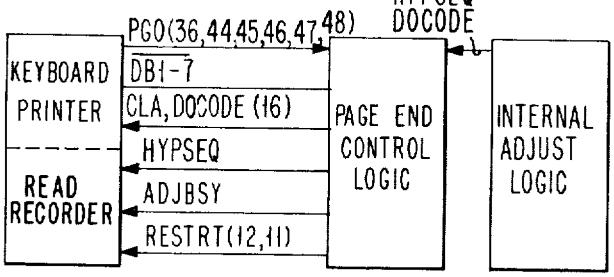
FIG. 3 is a diagram illustrating the cable connections between the Mag Card II keyboard printer read/-recorder and the unattended printing logic illustrating which of the cable pins in the IBM Mag Card II furnish certain of the signals to the page end contrl logic and which pins have signals applied thereto by the page end control logic.

Referring next to FIG. 3, there is shown in block diagram form, a keyboard printer read/recorder (host system) connected by a number of lines to the page end control logic which is also connected along a DOCODE line to the internal adjust logic of the IBM Mag Card II system. The internal adjust logic of the IBM Mag Card II system is described in the aforementioned cross-referenced application, entitled "Margin Adjusting of Textual Codes in a Memory". The DOCODE input is the output of latch 81 in that application. The significance of FIG. 3 is that it shows various signals on interface lines which are applied from the keyboard printer and read/recorder to the page end control logic and signals frm the page end control logic which are generated by it, are in turn applied to the keyboard printer and read/recorder. These signals are also utilized in the detailed description of the page end control logic. Shown associated with these signals are pin numbers which can be utilized to connect the keyboard printer read/recorder to the page end control logic. These pin numbers are identified and tied into associated schematic diagrams of the IBM Mag Card II I/O typewriter and read/recorder at pages 137 through 139 of the IBM Office Products Division, Customer Engineering Pictorial Reference/Adjustment Manual for the IBM Mag Card II Typewriter, form number 241-5583-3 (Revised), June, 1973. Thus, these pins and associated cable connections are identified and illustrate where the various signals are derived from and applied to. It will, of course, be recognized by those skilled in the art that the signals to the page end control logic and from the page end control must be adjusted in such a manner that the appropriate voltages are applied to respective units. Also, it will be recognized by those skilled in the art that to generate a pulse based on the signals appearing on the line, a single shot may be required. Prior to a detailed description of the page end control logic, a glossary of terms identifying the signals utilized in describing the page end control logic will be given.

GLOSSARY OF TERMS

ADJBSY — A line from the host system which defines scanning including all of the reference point logic.

BUFTT — a latch which when set indicates that a "Back Up Flag to Text", operation is occurring.

CLA,DOCODE— two lines from the host system which when pulsed simultaneously indicate a character has been played under secondary mode control of the host system.

DB1-DB7 — the data buss on which the bit pattern for characters is communicated.

FLAG — a character (code) in the shift register memory which marks the operating point of the shift register.

HYPSEQ — a line from the host system which defines when a hyphenation print has occurred and operator action is expected.

INTLR — a latch which when set indicates that the printer has been commanded and is performing an "Internal Line Return".

KBGO — a pulse from the host system indicating that a key has been depressed on the keyboard.

LCNT — a latch which when set indicates that the line count is being scanned.

LCNT1 — a latch which when set indicates that the line prior to the line having a line number corresponding to the desired line count of a page (hereinafter line count line) is being scanned, and also, in conjunction with a set condition of the LNCNTL latch (to be described immediately below), indicates that the line immediately after the line count line is being scanned.

LNCNTL — a latch which when set indicates that either the line count line or the line immediately after the line count line is being scanned. Also after the reference line is printed this latch remains set so that a record operation wll be initiated at the next depression of the "SCAN" button.

PBL — a signal which indicates that the line just prior to the line count line is about to be scanned.

PGO — a pulse from the read recorder indicating that the printer has been instructed to print a character.

PID — a signal which indicates that either a required carrier return or an index return has been sent to the printer.

PIDL,LAFPID— latches which determine and indicate a paragraph identification.

RESTL — a latch which sets when a line ending character is sent to the printer with either LCNT or LNCNTL set. It is also set if a line ending character is inserted from the keyboard after a hyphenation decision.

RESTRT — a signal which indicates that a carrier return character has been sent to the printer. (The printer is not printing at this time for it is in the NO PRINT mode).

SECMRST — a signal transmitted when several types of operations have terminated. Basically when the active secondary mode has been satisfied, this signal is generated. The reference line logic forces "line" secondary mode at the incidence of either a RESTRT or PID with either LCNT1 or LNCNT1 set. The following SECMRST is utilized as a timing pulse. This action was absolutely necessary to control the printing of the reference line because the scanning is done in "auto" secondary mode.

TXTC — a group of characters (codes) decoded from the shift register memory which terminate the BUFTT operation.

The above interface lines are identified in FIGS. 12 – 15 by an (I) following them. Prior to a detailed description of the present invention, for background purposes it should be understood that, as described in U.S. Pat. No. 3,675,216, the keyboard printer 8 is in two way communication with the DSR control and decode 13 which has circulated therethrough, the contents of the shift register 10. The outputs of the shift register 10 are taken along an output line into the DSR control and decode 13, through DSR control and decode 13, and back into the shift register 10. These seven bit characters, which continuously circulate around in the shift register 10, identify alpha numeric characters as well as control flags which are used for various control purposes as defined in U.S. Pat. No. 3,675,216. In addition, other control codes, as will be later described, are utilized to separate the shift register memory into alternate sections to allow switching of input to or output from the memory among the alternate sections. This, however, is not important relative to the subject invention. In addition, there is taught a technique of moving the flag which controls the operating point in the printer to various portions of the shift register. That is, as taught in U.S. Pat. No. 3,757,311, Ser. No. 239,342, filed Sept. 4, 1973, entitled "System for Outputting Lines about a Point of Operation," having James C. Byram, et al, as inventors, and assigned to the assignee of this invention and U.S. Pat. No. 3,755,784, Ser. No. 222,513, filed Aug. 28, 1973, entitled "System for Revision Line Retrieval," having John C. Greek, et al, as inventors, and assigned to the assignee of this invention. In U.S. Pat. No. 3,755,784 the flag can be either moved forward or moved backward to address various sections of the memory. For purposes of the present invention, however, it is only necessary to know that the control codes and alpha numeric characters are loaded into the shift register 10 from the mag card read/recorder 15 and recorded from the shift register 10 back onto the cards which are in the mag card read/-recorder 15. Detailed logic for the control of the shift register is contained in "System for Aligning Textual Character Fields," Ser. No. 427,616, filed Dec. 26, 1973, having D. W. Cooper, et al as inventors, and "Centering of Textual Character Fields about a Point," Ser. No. 428,542, filed Dec. 26, 1973, having D. W. Cooper, et al as inventors, and assigned to the same assignee of the present invention. This reading of data from a card can be initiated by depressing a key on the printer or can be as a result of a decode occurring in the shift register which indicates that more data is needed for printing.

Next a detailed description of various situations which occur which present problems to any automatic page end control system. For purposes of clarity since the SMRST signal, which is applied to an interface line, was not identified with respect to the cable pins, and since it is utilized in the subject page end control logic, reference is made to the aforementioned copending application entitled "System for Unattended Printing" for the development of this signal. The development of this signal is described in connection with FIG. 7. In that application, referring to FIG. 7, there is an OR gate 165 shown as being driven by AND gates 160 through 164. These various inputs are later discussed in the application. Suffice it to say that should any of the AND gates come true, OR gate 165 will set latch 166. Latch 166 is reset by detection of an operating flag occurring in the decode portion of the shift register, which is discussed in detal in that application. Setting of the latch 166 coupled with the detection of the flag by AND gate 167 generates the SMRST signal. The definition of this signal is that it is a pulse from the keyboard printer and read/recorder which indicates that a commanded operation has terminated. Thus, the various inputs, shown in FIG. 7 such as DOCODE, STOP, FLAG, AND gate 160, SEC 1, SEC 2, LINE END, DOCODE into AND gate 161, etc., comprise all the possible conditions which indicate that a particular commanded operation has been completed. These signals as described in the copending application are derived from the internal adjust logic; from the shift register decode, and for monitoring the various functions of the printer itself by means of the cable pins.

As described in the examples and system timing diagrams of the IBM Mag Card II, when scanning on either the LCNT-1 or the LCNT, or the LCNT+1 lines, the paragraph identification check need only be made on "played" line end codes and those line end codes inserted from the keyboard. The adjust logic also inserts carrier returns, but paragraph identification checks are not necessary because the adjust logic never creates a paragraph identification. Actually, this check is made at the end of each of the scanned lines. Consider the examples shown in FIGS. **4*a–c*.**

Assume that there is a lookahead success, that is, the adjust logic used the existing required carrier return (RCR) as the line ending on the line ending with the RCR, or scanning is being done in "play" mode.

In each case the playing of the RCR causes the transmission of a PID which immediately sets PIDL and RESTL. At the following SECMRST, BUFTT is set and the FLAG is moved backward down the text line until a TXTC is detected. When a TXTC is detected, an INTLR is initiated to quickly move the FLAG to the beginning of the text line. At this point, a line number, a carrier return, and the reference print of the text line is printed under internal adjust control as described in the aforementioned application "Margin Adjusting of Textual Codes in a Memory."

Figure 4A:
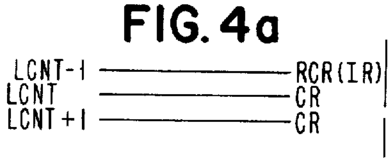
Figure 4B:
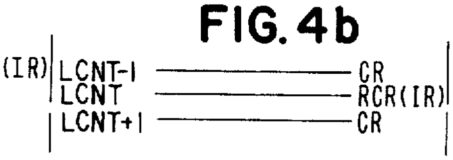
Figure 4C:
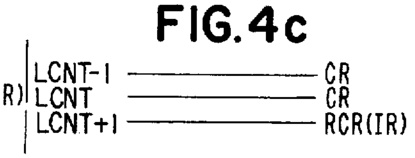
Figure 4D:
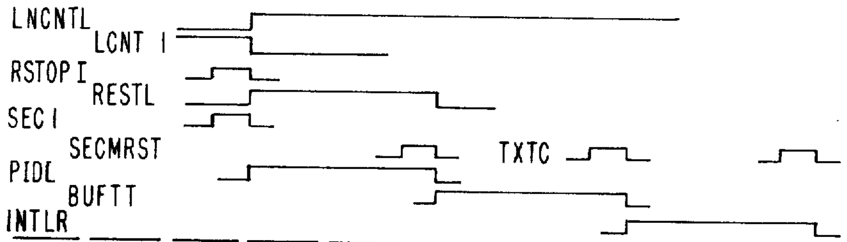
Figure 4E:
Figure 4F:
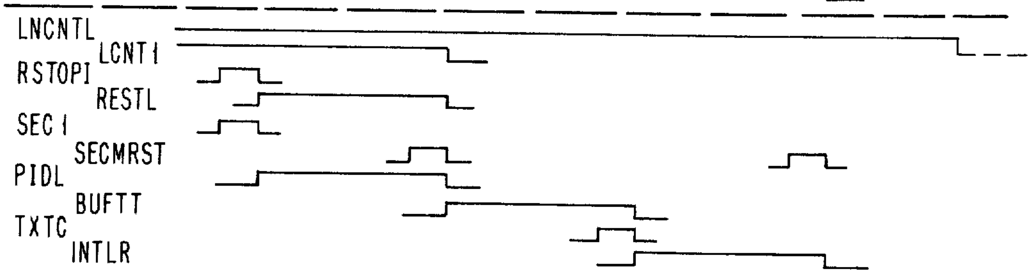

In FIG. 4a, the LCNT-1 line will be printed; in FIG. 4b, the LCNT line will be printed; and in FIG. 4c, the LCNT+1 line will be printed. Associated timing diagrams are shown in FIGS. 4d, 4e, and 4f.

Consider the following examples shown in FIG. 5a, b, and c.

In these examples, the logic is basically the same with a RESTRT setting RESTL, PIDL, and also LAFPID. Since the character immediately following the first carrier return is a character which, in conjunction with the carrier return, form a paragraph identification, then LAFPID resets and PIDL remains set. At the following SECMRST, BUFTT is set and the FLAG is moved backward until a TXTC is detected. At this point, an INTLR is performed and a reference print follows.

The LCNT-1 line will be printed in FIG. 5a; the LCNT line will be printed in FIG. 5b; and the LCNT+1 line will be printed in FIG. 5c.

Consider the following case shown in FIG. 6a.

As previously mentioned, a paragraph identification check is made at the end of each scanned line, but this determination is ignored until either LCNT1 or LNCNTL is set. However, single character paragraph identifications (RCR, INDRET) are checked as if they were normal carrier returns prior to the setting of either LCNT or LNCNTL to handle the case in FIG. 6a.

The logic then does not detect a paragraph identification at the end of the LCNT-2 line, and the LCNT+1 line is printed for a reference print.

Associated timing diagram is shown in FIG. 6b.

Consider the following modification of FIG. 6a. In this case, a paragraph identification is detected at the end of the LCNT-2 line, and at the scanning of the carrier return at the end of the LCNT-1 line a printout of that line would occur using previously described logic. However, this is an illegal reference line, and a corrective measure must be taken. If any text code is scanned within the LCNT-1 line prior to it's carrier return, then PIDL is reset. Thus, scanning would continue, and the LCNT+1 line would be output for a reference line for the case in FIG. 7a. Associated timing diagram is shown in FIG. 7b.

A slight modification of FIG. 7a results in FIG. 8a.

In this situation a paragraph identification sequence is also found ending the LCNT-2 line of text. Actually, any combination of these line ending characters will be handled identically. However, a text code does not exist between the line end of the LCNT-2 line and the line end of the LCNT-1 line. Thus, the PIDL latch will remain set, and at the scanning of the line end of the LCNT-1 line of text, "line" secondary mode is forced. At the following SECMRST, BUFTT is set, and the FLAG is moved backward through the two line ending characters to a TXTC. Then INTLR is set to quickly move the FLAG to the beginning of the LCNT-2 line, which will be printed for the reference line.

Associated timing diagram is shown in FIG. 8b.

Up to this time, several examples have been described as to how the reference print is executed relative to the location of paragraph identifications.

In FIG. 9a, there are no paragraph identifications to be detected. However, the logic does not realize this until the line end of the LCNT+1 text line has been scanned. With LNCNTL and LCNT1 set denoting the LCNT+1 line of text, "line" secondary mode is forced at the scanning of the line ending. At the following SECMRST, BUFTT and PIDL are set, and the FLAG is moved backward until a TXTC is detected. An INTLR is performed, and at the occurance of the SECMRST falling to a low level and terminating the INTLR operation, another BUFTT is initiated, and PIDL becomes reset. At the termination of BUFTT another INTLR is initiated to quickly move the FLAG to the beginning of the LCNT line, and the LCNT line is printed for the reference line.

Associated timing diagram is shown in FIG. 9b.

The previous discussion has been assuming scanning in "play" mode or scanning in adjust with lookahead successes occurring in such a manner so that the original line end will be utilized for that line. This was done for clarity of explanation, but these operation assumptions do not depict the "normal" mode of operation.

For a vast majority of the time, the IBM Mag Card II with Internal Adjust will be operating in the "adjust" mode, and there will be lookahead successes of the type which will require the adjust logic to insert carrier returns. As previously pointed out, no paragraph identification checks are done in this case.

To complicate matters, lookahead failures will occur in that the adjust logic will not find a suitable line ending point. Here a hyphenation print will occur, and a hyphen could be printed after the line number indicating a last word of paragraph, as described in the aforemention application, "Margin Adjusting of Textual Codes in a Memory."

Hyphenation prints can occur on any scanned line including the LNCT-2, LCNT-1, and LCNT lines. The action of consequence is the insertion of a line ending character from the keyboard. A paragraph identification check is made, but the timing of the setting of LAFPID and PIDL is necessarily different because the insertion of a line ending character is different from execution of a line ending character in the "play" mode.

Figure 10C:
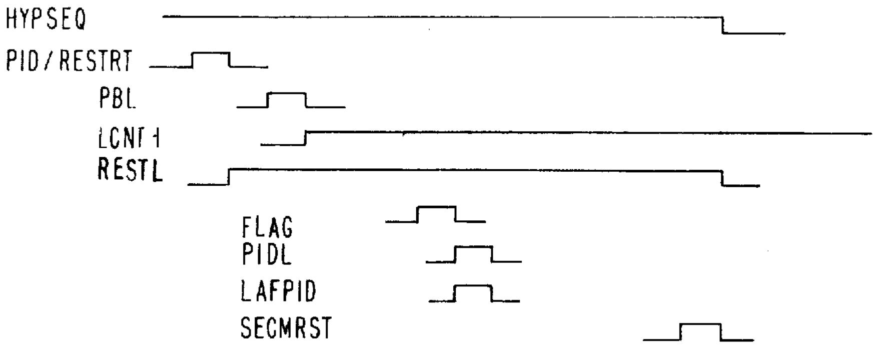
Figure 10D:
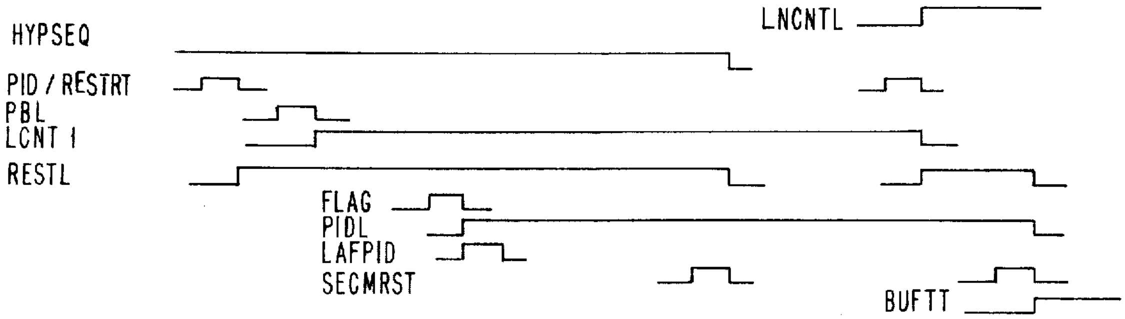

Consider the following cases:

The cases described in FIG. 10a and FIG. 10b are logically identical to FIG. 6a and FIG. 8a respectively after LAFPID and PIDL are set. This is shown in FIGS. 10c and 10d.

Figure 11A:
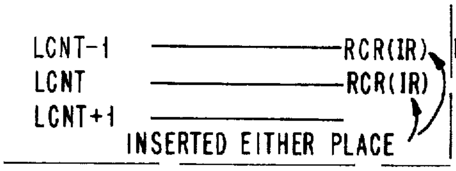

Consider the following cases shown in FIGS. 11a, b, and c.

Figure 11B:
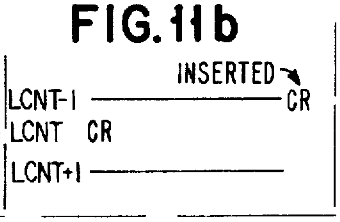
Figure 11C:
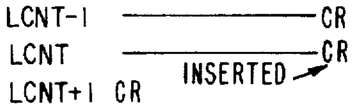
Figure 11D:
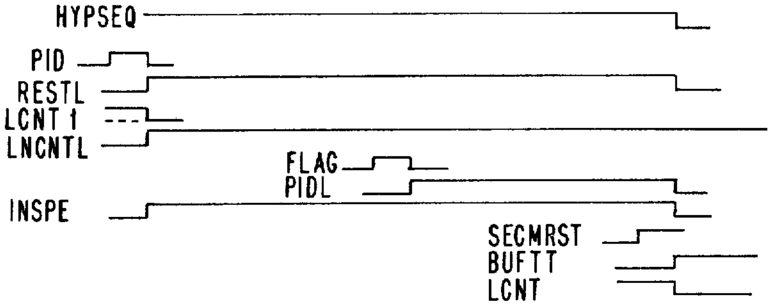
Figure 11E:
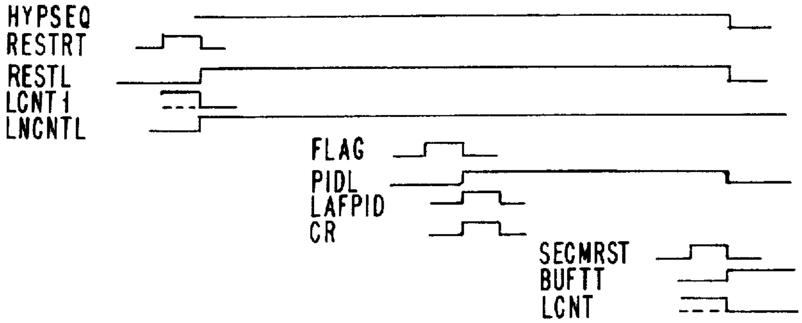
Figure 12:
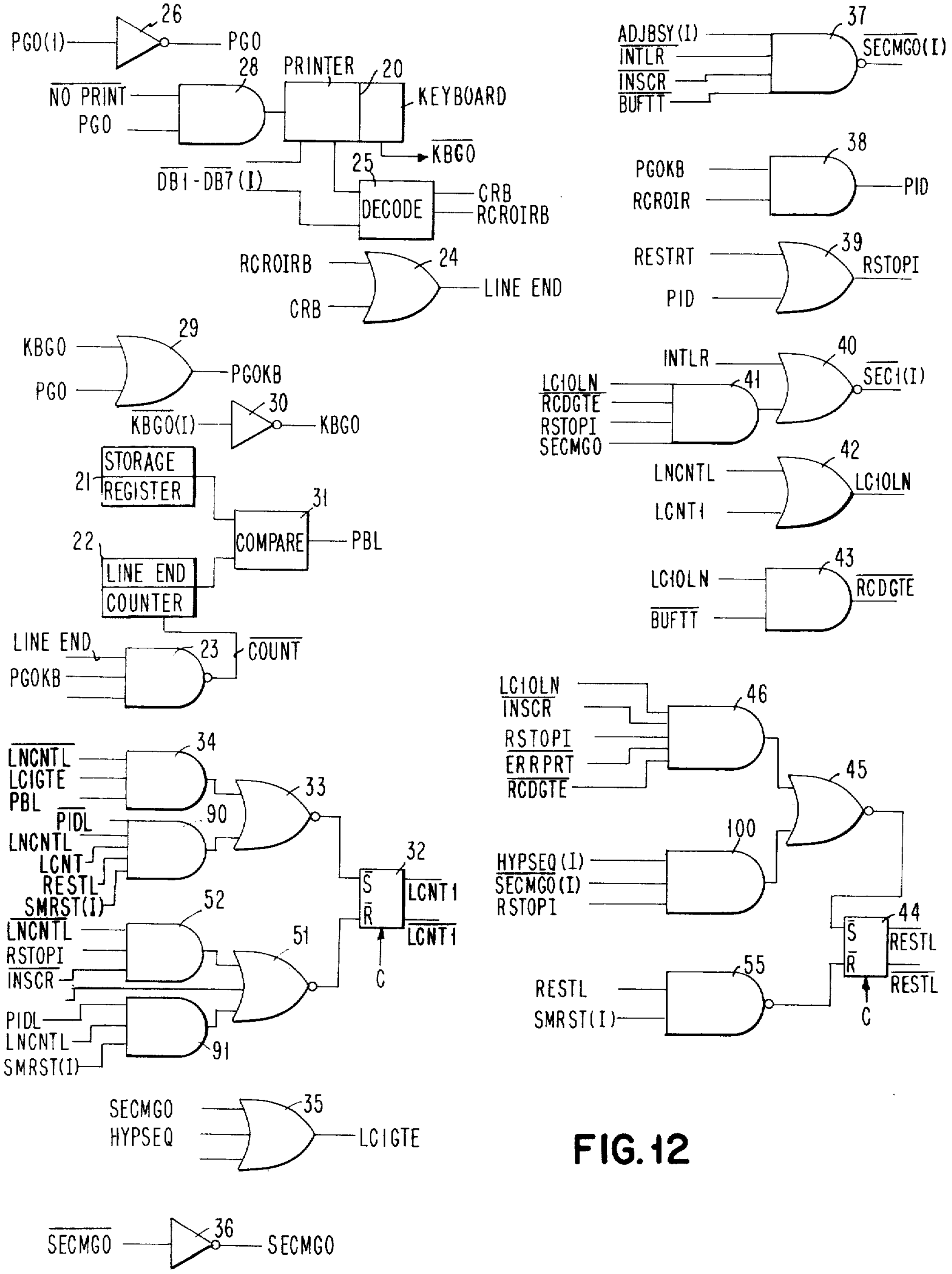
Figure 14:
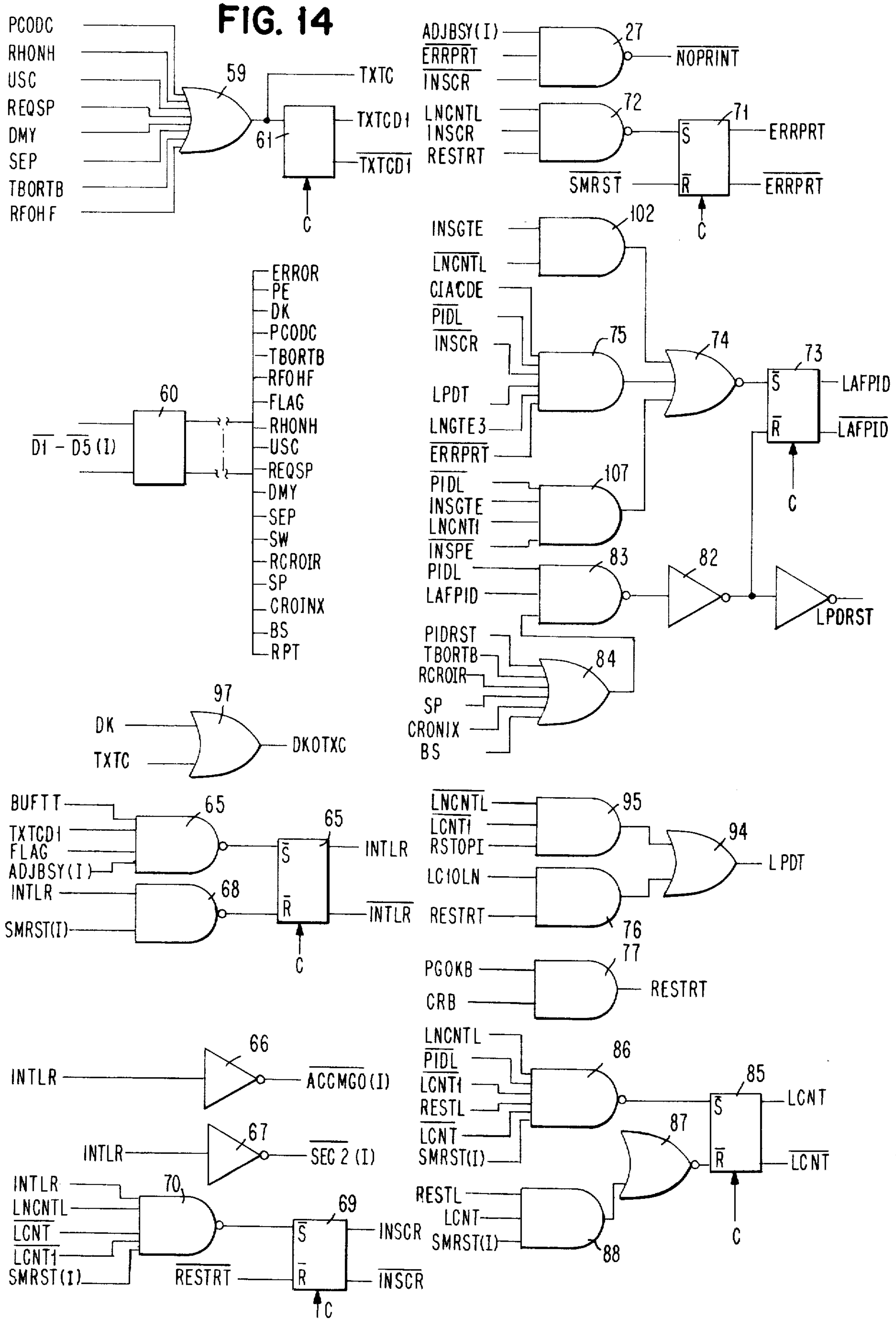

The cases described in FIGS. 11a, 11b and 11c are logically identical to the cases described in FIGS. 4a, 4b, 5a, and 5b, respectively, respectively after LAFPID and/or PIDL are set. This is shown in FIGS. 11d and 11e.

A hyphenation decision is never presented to the operator on the LCNT+1 line. If a lookahead failure occurs on the LCNT+1 line, BUFTT is immediately set at the SECMRST denoting the lookahead failure. The sequencing from this point is identical to that shown in FIG. 9b. It is assumed that since a lookahead failure did occur, there was not a paragraph identification within the six character lookahead. Therefore, the LCNT line is printed for a reference print.

In summary, since scanning is done in the NO PRINT mode, a means of presenting the pagination point must be presented to the operator. The number of lines desired per page has been previously entered, and when that number of lines have been scanned, a reference print on the last line to be on that page will occur. However, for a proper and acceptable pagination decision, the reference print will neither be the next-to-the-last line of a paragraph nor the first line of a paragraph.

Refer next to FIGS. 12 – 15 where there is shown for purposes of clarity, the overall sequential logic which accomplishes the page end control function as above described. This logic is shown for purposes of clarity in unconnected form, but with each of the input lines to the various portions of the logic identified in a common manner throughout the four drawings, 12 – 15. It is felt that this type of presentation, described in narrative form, taken with the previously discussed timing diagrams, will be more clear than connecting each of the lines and having the number of lines criss-cross back and forth over each other and run from page to page. Thus, the fragmental approach with individual lines always uniquely identified is taken. To prepare for a page scan operation, the operator places paper in the printer portion of the keyboard printer and inserts magnetic cards to be scanned in the read/recorder unit. Upon depressing the power-on key, all latches are reset by the power on reset signal (POR). Also as shown, all latches are set and reset by a low logical level. Next, the page count must be entered into the machine. This is done by depressing the code key and the line return key on the keyboard printer portion of keyboard printer 20. This number is stored in storage register 21.

To access the operator keyed line number, scanning of the page of text will count line endings until the count in the line end counter 22 is one less than the number that is stored in storage register 21 because at the end of each previously scanned line, line end counter 22 is incremented through NAND gate 23 whose inputs are LINE END and PGOKB. The LINE END signal is the result of the required carrier return or index return on the data buss or a carrier return on the data buss through OR gate 24. These decodes come from decode 25, which is monitoring the data buss. The host system (keyboard printer and read/recorder) is placing bit patterns for characters on the data buss and sending them to the printer portion of keyboard printer 20. Along with each character sent to the printer, there is an associated PGO. This is sourced from the host system (keyboard printer and read/recorder) by PGO and is inverted through inverter 26 to generate PGO. Even though PGO's are being sent to the printer portion of keyboard printer 20, the printer is not printing because NO PRINT is being driven from NAND gate 27, whose inputs are ADJBSY, ERRPRT, and INSCR. Thus, at this time, the output of AND gate 28 is not active. PGOKB is generated from OR gate 29 whose inputs are KBGO and PGO. KBGO is sourced through inverter 30 from interface line KBGO. Thus, when the contents of line end counter 22 become one less than the contents of storage register 21, a compare is made through compare 31 and a bit time PBL is generated. A description of the cases described in FIG. 4*a*, 4*b*, and 4*c* will now be given. The LCNT1 latch 32 is set at the occurrence of the PBL through NOR gate 33 and AND gate 34 whose inputs are LNCNTL, LC1GTE, and PBL. LC1GTE is sourced through OR gate 35 whose inputs are SECMGO and HYPSEQ. SECMGO is generated through inverter 36 whose input is interface line SECMGO. At this time, SECMGO is being driven through NAND gate 37 whose inputs are ADJBSY and INTLR, INSCR, and BUFTT. It will now be noted that ADJBSY is an umbrella type latch which is set throughout all the described operations.

If the line ends in a single character paragraph identification, like required character or index return, the RCROIR on the data buss will be generated by decode 25 and will be ANDED with PGOKB through AND gate 38 to generate PID. PID is an input to OR gate 39 and RSTOPI will be generated. At this time, the interface line SEC1 is pulsed through NOR gate 40 and AND gate 41 whose inputs are LC10LN, RCDGTE, RSTOPI, and SECMGO. LC10LN is sourced through OR gate 42 whose inputs are LNCNTL and LCNTL. RCDGTE is sourced through AND gate 43 whose inputs are LC1OLN and BUFTT. This pulse on interface line SEC1 places the host system in the line mode which will be satisfied by the single character paragraph identification which pulsed SEC1. As a consequence, a SMRST will be generated from the host system. Also, at the instance of this RSTOPI, the RESTL latch, 44, will set through NOR gate 45 and AND gate 46. Also, the PIDL latch, 47, will set through NOR gate 48 and AND gate 49 whose inputs are LNGTE3, INSCR, ERRPRT, RSTOPI, and CLACDE. CLACDE is sourced through AND gate 50 whose inputs are CLA and DOCODE. The coincidence of these two signals guarantees the character that is being handled is a result of a secondary mode playout. Paragraph identification checks need only be made after played line ends, since the host system, when it inserted a line end character, does not create a paragraph identification.

Also, at the RSTOPI signal, LCNT1 latch 32 will reset through NOR gate 51 and AND gate 52 whose inputs are LNCNTL, RSTOPI, and INSCR. Also, LNCNTL latch 53 will set through NAND gate 54 whose inputs are LCNT1, RSTOPI, and INSCR. No reset to latch 53 is developed since its resetting is not required in the present system. At the previously mentioned SMRST, the RESTL latch 44 will reset through NAND 55 whose inputs are RESTL and SMRST. Also, the PIDL latch 47 will reset through NOR gate 56 and AND gate 57 whose inputs are PIDL, PINH, and SMRST, and the BUFTT latch 62 will set through NOR gate 92 and AND gate 93. At this time, the flag in the shift register is moved backward a character per memory revolution by pulsing interface line CLD through NAND gate 58 whose inputs are BUFTT, ADJBSY, TXTCD1, and FLAG. When a TXTC is encountered, an output will come from OR gate 59 whose inputs are PCODE, RHONH, USC, REQ SP, DMY, SEP, TBORTB, and RFOHF. These decodes, including the FLAG decode, come from decode 60 whose input is the decode buss from the host system. Decode 60 provides, as shown, the following decoded signals for application to the logic of the system.

| | |
|---|---|
| ERROR | error code |
| PE | page end code |
| DK | dead key code |
| PCODC | print character or double character |
| TBORTB | tab or required tab |
| RFOHF | record flag or holding flag |
| FLAG | flag code |
| RHONH | required hyphen or normal hyphen |
| USC | underscore code |
| REOSP | required space |
| DMY | dummy code |
| SEP | separator code |
| SW | switch code |
| RCROIR | required carrier return or index return code |
| SP | space code |
| CROINX | carrier return or index code |
| BS | backspace code |
| RPT | repeat code |

when a TXTC does occur, it is delayed through delay 61 to generate TXTCD1. At this time, the BUFTT latch 62 is reset through NAND gate 63 whose inputs are BUFTT, TXTCD1, FLAG, and ADJBSY and the INTLR latch, 64, is set through NAND gate 65 whose inputs are BUFTT, TXTCD1, FLAG and ADJBSY. The INTLR latch, being set, drives interface line ACCMGO through inverter 66. Also, it drives interface line SEC1 through NOR gate 46 and SEC2 through inverter 67. This then commands the host system to move the operating flag back to the beginning of the line count minus 1 line, in this case. When this operation has been accomplished, a SMRST will be generated from the host system. INTLR latch 65 will be reset through NAND gate 68 whose inputs INTLR and SMRST. Also, the INSCR latch 69 will set through NAND gate 70 whose inputs are INTLR, LNCNTL, LCNT, LCNT1, and SMRST. At this time, the NO PRINT line will cease to be driven through NAND gate 27. A carrier return will be output to the printer when that is done and RESTRT signal will be generated. INSCR latch 69 will be reset by the RESTRT signal, and the ERRPRT latch 71 will be set through NAND gate 72 whose inputs are LNCNTL, INSCR, and RESTRT. The interface line SECMGO will again be driven when the BUFTT, INTLR and INSCR latches have been reset. Therefore, at this time, the line count minus 1 line will now be printed for the operator reference. The preceding description includes the example of FIG. 4*d*.

For the case where the single character paragraph identification is found at the end of the line count line, FIG. 4*e*, the following logical sequence occurs. Once again the LCNT1 latch, 32, is set through AND gate 34 and NOR gate 33 by PBL. The line end at the end of the line count minus 1 line is checked for paragraph identification. Assume the line end is a carrier return, which along with a group of other function type codes, is defined as a paragraph identification. The "look for paragraph ID" latch, LAFPID, 73, is set through NOR gate 74 and AND gate 75 whose inputs are CLACDE, PIDL, INSCR, LPDT, LNGTE3 and ERRPRT.

In this case, LPDT comes from AND gate 76 whose inputs are LC1OLN and RESTRT. RESTRT is generated from AND gate 77 whose inputs are PGOKB, and CRB. Also, a RSTOPI is generated through OR gate 39 whose inputs are RESTRT and PID. Thus simultaneously the PIDL latch 47 sets through NOR gate 48 and AND gate 49 whose inputs are LNGTE3, INSCR, ERRPRT, RSTOPI and CLACDE. LNGTE3 is generated by OR gate 78 whose inputs are ADJBSY and HYPSEQ. Thus, a look at the next character after the carrier return is now done. The next character is one of a large group of codes that are input into OR gate 79 and the PIDL latch 47 is reset through NOR gate 56, AND gate 96, and OR gate 79. Also, a PIDRST is generated through inverter 81 and the LAFPID latch 73 is reset through inverter 82, NAND gate 83 and OR gate 84. Since the PIDL latch did not remain set, a paragraph identification was not located at the end of the line count minus 1 line. At the previously mentioned RSTOPI, the LNCNTL latch 53 is set through NAND gate 54. SEC1 is, of course, driven through NOR gate 40 and AND gate 41 which forces the host system into line mode. The restart latch RESTL 44 also is set through NOR gate 45 and 46. At the following SMRST, the LCNT latch 85 will set through NAND gate 86 whose inputs are LNCNTL latch, PIDL, LCNT1, RESTL, LCNT, and SMRST. Now the line count line is being scanned. At the single character paragraph identification at the end of the line count line, the RESTL latch 44 again sets. The PIDL latch 47 also sets. It should be noted that LAFPID does not set at this time because single character paragraph IDs are already known to be paragraph identifications, and there is no need to look for a paragraph identification. At the following SMRST from the host system, the LCNT latch 85 will reset through NOR gate 87 and AND gate 88 whose inputs are RESTL, LCNT, and SMRST. Again the BUFTT latch 62 sets and the described sequence of events from this point on for FIG. 4e is exactly like that sequence of events which occurred from the corresponding point in FIG. 4d.

For FIG. 4*f*, the single character paragraph identification is assumed to be at the end of the line count plus 1 line. The sequence of events leading up the the scanning of the line count line is exactly the same as described in connection with FIG. 4*e*. A carrier return is then assumed to end the line count line. A RSTOPI signal, therefore, results through OR gate 39. The LAFPID latch 73 the PIDL latch 47 and the RESTL latch 44 set, and line mode is forced in the host system. Upon not detecting a paragraph ID, the LAFPID latch 73 and the PIDL latch 47, both reset as previously described. At the following SMRST signal, which is inverted through inverter 89 to generate SMRST, the LCNT latch 85 resets through NOR gate 87 and AND gate 88. Also at this time, the LCNT1 latch 32 will set through NOR 33 and NAND gate 90 whose inputs are PIDL, LNCNTL, LCNT, RESTL, and SMRST. The RESTL latch 44 then resets through NAND gate 55. At the occurrence of the single character paragraph identification, which is assumed to be at the end of line count plus 1, the PIDL latch 47 and the RESTL latch 44 both set, and line mode is forced in the host system. Thus, at the following SMRST, the LCNT1 latch 32 will reset through NOR gate 51 and AND gate 91 whose inputs are PIDL, LNCNTL, and SMRST. Again BUFTT 62 will set through NOR gate 92 and AND gate 93. The description from this point on for FIG. 4f is exactly the same as the description from the corresponding point on FIG. 4*e*.

FIGS. 5*a*, 5*b*, and 5*c* show a double carrier return paragraph identification at the end of the line count minus 1 lines, the line count line, and the line count plus 1 respectively. The sequence of events for FIGS. 5*d*, 5*e*, and 5*f* are exactly as those explained for FIGS. 4*d*, 4*e*, and 4*f* with exception of the way that the paragraph identification is actually determined. In each case, the LAFPID latch 73 is set through NOR gate 74 and AND gate 75, and the PIDL latch 47 is set through NOR gate 48 and AND gate 49. If the next code after the carrier return is either a tab or required tab, required carrier or index return, a space, a carrier return or index, or a backspace, the LAFPID latch 73 will reset through inverter 82, NAND gate 83 and OR gate 84. However, the PIDL latch 47 will remain set. Therefore, a paragraph identification sequence can be split with certain control codes, (most notable among these codes is the stop code), and the paragraph identification sequence is recognized by ignoring these intervening certain control codes.

FIG. 6a depicts a single character paragraph identification at the end of the line count minus 2 line. Actually prior to the LCNT1 latch 32 or the LNCNTL latch 53 setting, single character PID signals are checked as if they were normal carrier returns. However, parenthetically, if any type of paragraph identification is detected prior to the LCNT1 latch 32 or the LNCNTL latch 53 setting, the PIDL latch 47 which reflects this determination, will be reset at the occurrence of the next FLAG by AND gate 56a whose inputs are PIDL, LCNT1, LNCNTL, and FLAG. Therefore, both the LAFPID latch 73 and the PIDL latch 47 set at these times. In this case, the LAFPID latch 73 is also set by LPDT which is sourced at OR gate 94. It should be noted, however, that one of the terms generating LPDT comes through AND gate 95 whose inputs are LNCNTL, LCNT1, and RESTOPI. The associated timing diagram depicting this case is shown in FIG. 6*b*.

A special case occurs when the line count minus 2 line ends in a required carrier return or single character PID and the line count minus 1 line begins with a tab or indent tab. However, a valid paragraph identification has been determined, and the PIDL latch 47 will remain set. Consequently, at the carrier return ending the line count minus 1 line, it will printout for reference print. However, this is an illegal reference line, and corrective measures must be taken. Therefore, if any TXTC or a DK character is scanned prior to the output of the line count minus 1 line carrier return, then the PIDL latch 47 will be reset through NOR gate 56 and AND gate 80 whose inputs are LNCNTL, LCNT1, DKOTXC, and CLACDE. DKOTXC is sourced through OR gate 97 whose inputs are DK and TXTC. Thus, with the PIDL latch 47 reset, the line count plus 1 line will print for reference print as shown in FIG. 7*a* with associated timing diagram in FIG. 7*b*.

FIG. 8a, with associated timing diagram 8*b*, depicts the case where there is not a DK or TXTC between the line end of the line count minus 2 line and the line end of the line count minus 1 line. Therefore, the line count minus 2 line ends with a paragraph definition regardless of the combination of line end codes which end the line count minus 2 and the line count minus 1 lines. Thus, at the line end code of the line count minus 2 line, both the LAFPID latch 73 and the PIDL latch 47 set. However, since the very next code is a line ending code, the LAFPID latch 73 resets and the PIDL latch 47 remains set. Since there are no text codes or dead keys to be played before the line end code of the line count minus 1 line is scanned, the PIDL latch 47 remains set. The RESTRT generated by this line end code sets the RESTL latch 44 and since the LCNT1 latch 32 is set, then the host system is forced into line mode. At the following SMRST, the BUFTT latch 62 is set, the RESTL latch 44 is reset, and PIDL latch 47 is also reset through NOR gate 56 and AND gate 57. With the BUFTT latch 62 now set, the sequence of events continues as previously described.

The operational description of the logic concerning the reference print has been described using either single character paragraph identifications or character sequences which generate paragraph identifications. In FIG. 9a it will be noted that there are no paragraph identification codes at all in the reference print area. Again at the end of the line count minus 2 line, a PBL will be generated from compare 31, and the LCNT1 latch 32 will be set. At the carrier return at the end of the line count minus 1 line, RSTOPI is generated which resets LCNT1 latch 32 and sets the LNCNTL latch 53 sets the RESTL latch 44, sets the LAFPID latch 73, sets the PIDL latch 47, and forces line mode in the host system. The PIDL latch 47 and the latch 73 reset because no paragraph identification is detected. At the following SMRST, the RESTL latch 44 resets, and the LNCT latch 85, sets. The line count line is now being scanned. The carrier return at the end of the line count line is scanned. The same sequence of events occurs with the exception that the LCNT latch 85 resets at the SMRST, and the LCNT1 latch 32 sets again at the same SMRST. At this time, the line count plus 1 line is now being scanned. When the carrier return at the end of the line count plus 1 line is scanned, again the same sequence of events occur. However, at the following SMRST, as shown in FIG. 9b, the PIDL latch 47 sets through NOR 48e 248 and AND gate 98 whose inputs are LNCNTL, LCNT1, PIDL, ERRPRT, LNGTE3, INTLR, and SMRST. Simultaneously, the BUFTT latch 62 sets through NOR gate 92 and AND gate 99, whose inputs are LNCNTL, LCNT1, PIDL, ERRPRT, LNGTE3, INTLR, and SMRST. When a TXTC is found, the BUFTT latch 62 resets through NAND gate 63 and the INTLR latch 64 sets through NAND gate 65. At the SMRST terminating the internal line return, the PIDL latch 47 resets through NOR gate 56 and AND gate 57. Also, the LNCT1 latch, 32 resets through NOR gate 51 and AND gate 91 whose inputs are PIDL, LNCNTL, and SMRST. Simultaneously, the BUFTT latch 62 is again set through NOR gate 92 and AND gate 93. When a TXTC is again found, the BUFTT latch 62 is reset, and the INTLR latch 65 is again set. At the SMRST terminating the internal line return, the INSCR and ERRPRT sequence, from this point on function as previously described.

For explanatory clarity, the scanning previously described was always either in the play mode or scanning has been done in adjust with lookahead success occurring in such a manner so that the original line end will be utilized for the lines. Actually, lookahead failures can occur on either the line count minus 2, the line count minus 1, or line count lines as previously mentioned. When the host system is scanning, lookahead failures cause hyphenation decisions to be presented to the operator in the form of hyphenation prints. When a hyphenation print occurs, the operator then has the option of performing her own line end decisions. To define this time, there is an interface signal called HYPSEQ, which is up at this time. The primary concern here is the operator keyboarding a carrier return, index return or required carrier return, and, in the case of a carrier return, whether or not she created a paragraph identification by inserting the carrier return in front of another carrier return, index return or required carrier return. This is shown in FIGS. 10*a* and 10*b* and in the corresponding timing diagrams in FIGS. 10*c* and 10*d*, respectively. Consider the case of a hyphenation print on the line count minus 2 line. When the operator keys either a single character paragraph identification or a carrier return, the bit pattern for either the carrier return or the single character paragraph identification is placed on the data buss lines. Simultaneously, with a KBGO being driven from the host system, decode 25 will generate either CRB or RCROIRB. Interface line KBGO is inverted through inverter 30 to generate KBGO. PGOKB is generated through OR gate 29, and through AND gates 77 or 38, either a RESTRT or a PID, respectively, is generated. Either the RESTRT or PID will generate a RSTOPI through OR gate 39, and the RESTL latch 44 will set through NOR gate 45 and AND gate 100 whose inputs are HYPSEQ, SECMGO, and RSTOPI. At the occurrence of the next FLAG, the host system will insert the character that was entered, and the objective is to sample the next character after the character that was entered and check for paragraph identification sequence. To accomplish this, an INSGTE is generated by AND gate 101 whose inputs are HYPSEQ, SECMGO, FLAG, and RESTL latch. At this time, the LAFPID latch 73 sets through NOR gate 74 and AND gate 102 whose inputs are INSGTE and LNCNTL. Also, the PIDL latch 47 will set through NOR gate 48 and AND gate 103. A paragraph identification sequence check is now made, and since there is none in this case, both the LAFPID latch 73 and the PIDL latch 47 are reset.

After the keyboarded character has been successfully inserted by the host system, a SMRST will be generated. The RESTL latch 44 resets, and the interface line HYPSEQ resets. The scanning of the line count minus 1 line now begins with the LCNT1 latch 32, already set by the PBL that occurred. With everything remaining the same except that a paragraph identification was created, the PIDL latch 47 would have remained set, and at the SMRST generated from the successful insertion of the character into the host system, the RESTL latch 44 will reset. The interface line HYPSEQ will also go down, but the PIDL latch 47 will not reset because PINH through NAND gate 104 whose inputs are LNCNTL and LCNT1 are inhibiting AND gate 57 from resetting the PIDL latch 47. When the line ending character of the line count minus 1 line is then scanned, either a RESTRT or a PID is generated. At this time the LNCNTL latch 53 sets, the LCNT1 latch 32 resets, the RESTL latch 44 sets again; and at the following SMRST, the RESTL latch 44 resets, and the BUFTT latch 62 sets. From this point on the sequences that take place are as previously described.

In a situation where a single character paragraph identification is inserted either at the end of the line count minus 1 line or the line count line, as depicted in FIG. 11*a*, the reference print determining logic is the same. The LCNT1 latch 32, the LNCNTL latch 53, and the LCNT latch 85 will be in the proper states to reflect the line that is now being scanned. At the occurrence of the PID signal, the RSTOPI will be generated through OR gate 39, and the RESTL latch 44, will set through NOR gate 45 and AND gate 100. Also, the INSPE latch 105 will set through NAND gate 106 whose inputs are HYPSEQ, SECMGO, and PID. The HYPSEQ interface line will be up, and at the next FLAG, an INSGTE signal will be generated from AND gate 101. The PIDL latch 47 will be set through NOR gate 48 and AND gate 103, but this time the LAFPID latch 73 will not be set because INSPE latch 105 is set, and AND gate 107 will not be active. Therefore, at the SMRST from the successful insertion of the character into memory, INSPE latch 105 will reset, RESTL latch 44 will reset, HYPSEQ interface line will go down, and the PIDL latch 47 will reset. BUFTT latch 62 will set and from this point on the sequence of events is identical to what has already been described. This is shown in FIG. 11d.

With the situation the same as depicted in 11e, but with a carrier return inserted, a RESTART is generated and the INSPE latch 105 will not set. Therefore, at the INSGTE, which occurs at the FLAG, both the LAFPID latch 73, and PIDL, latch 47 will set. Since the next character is a carrier return, the PIDL latch 47 will remain set, and the LAFPID latch 73 will reset. Therefore, at the SMRST from the successful insertion of the carrier return from the keyboard, the RESTL latch 44 will reset, the PIDL latch 47 will reset, HYPSEQ interface line will go down, and the BUFTT latch 62 will set. The operation from this point on is as previously described.

A lookahead failure can occur on the line count plus 1 line. At the end of a line count minus 2 line, the PBL will set the LCNT1 latch 32. At the carrier return at the end of the line count minus 1 line, the LAFPID latch 73, the PIDL latch 47, and the RESTL, 44, will all three set. Also, the LNCNTL latch 53 will set, and the LCNT1 latch 32 will reset. Since no PID will be found, the LAFPID latch 73 and the PIDL latch 47 will reset. At the following SMRST, the RESTL latch 44 will reset, and the LCNT latch 85 will set. At the line end of the line count line, the LAFPID latch 73 and the PIDL latch 47 will set. At the following SMRST, the RESTL latch 44 will reset. Also the LCNT latch 85 will reset, and the LNCT1 latch 32 will set again. At this time the line count plus 1 line is being scanned. In this case, assume that a lookahead failure will occur on the line count plus 1 line. This occurs when the host system does a lookahead on an overflow word and does not find a valid point in which to determine the line endings. Normally, in these cases, a hyphenation decision is presented to the operator. However, since the system is on the line count plus 1 line, the SMRST signal from the host system, which generally triggers a hyphenation decision, will not do that in this case, but will set the BUFTT latch 62 and the PIDL latch 47. The result is two BUFTT and internal line return sequences. The logical operation for the sequence of events is identical to that description given for FIG. 9*a* and timing diagram, FIG. 9*b*. The assumption is that since a lookahead failure did occur, there was not a paragraph identification within the six character lookahead done by the host system. Therefore, the line count line in this case is prepared for a reference print.

In summary, in the IBM Mag Card II System there are the capabilities capability of (1) reading a card, which is initiated by depressing a read key, (2) entering data into and clearing the shift register memory which includes primary and alternate sections, and (3) playing text from either memory section. The data flow in the system in the print mode is from a card read/recorder through a shift register memory to operate the printer. Data flow during a record operation is from the keyboard through the shift register memory and onto the magnetic card in the recording area of the read/-recorder mechanism. The system includes a read/-recorder mechanism which will hold fifty cards. In the present reference line printout technique, the above capabilities of the IBM Mag Card II will be utilized. In addition to the silent scan logic which is activated by depressing a scan key which causes the shift register memory to be scanned to adjust lines to the desired length in the event that they have not been adjusted, and in the event that they are adjusted, logic is provided in the present invention to printout a reference line in accordance with excepted word processing rules.

In operation, the page count of the number of lines per page is entered into a storage register with the magnetic cards having data thereon to be scanned inserted into the hopper. The first card is fed from the hopper and as soon as the first read character is in the memory, the auto secondary mode is automatically activated by the unattended printing logic described in the aforementioned unattended printing application. The line end counter is incremented at the playout of each line ending character. The text in the shift register memory is continually scanned and line adjustments are made without playout except that if the data has not already been adjusted, playout of words which require hyphenation decisions is made in accordance with the teachings contained in the other referenced application, "Margin Adjusting of Textual Codes in a Memory". When the number of line endings equals the count entered in the system by the operator, the scanning of the lines is terminated and a decision is made as to which line is to be played out for reference purposes by the operator. Logic is provided to prevent the reference line that is being played out from being the next to last line of a paragraph or the first line of a paragraph to conform with the above discussed word processing page ending rules.

While the invention has been particularly shown and described with reference to a preferred embodiment thereof, it will be understood by those skilled in the art that the foregoing and other changes in form and details may be made therein without departing from the spirit and scope of the invention. For instance while the IBM Mag Card II has been described as the host system, other types of word processing systems offered by other manufactures could also be used. That is, while the impact printer of the IBM Mag Card II is described other operator readable output means, such as displays or ink jet printers, could also be used to visually present the data to the operator.

What is claimed is:

1. In a word processing system usable by an operator for playout of previously stored control and textual codes to present a visual textual representation thereof for editing purposes, said system comprising:

means for storing said control and textual codes;

means for providing an operator readable output to said operator;

first logic means connected to said storing means for converting said control and textual codes into operator readable text lines;

means connected to said first logic means operable to allow said operator to enter a desired line count representing the desired number of lines which will constitute a page of information; and second logic means connecting said first logic means and said operator readable output means and connected to said line count means, said second logic means being operative to count text lines from the beginning of a page in said storing means and for gating a single particular text line to said output means, the line count of said single particular text line being approximately equal to said desired line count with the exceptions that said particular text line is neither the next to the last line of a paragraph nor the first line of a paragraph.

2. The word processing system of claim 1 further including hyphenation logic means for allowing said operator to make hyphenation decisions in the event a hyphenation sequence is required in said single particular text line presented to said operator.

3. The word processing system of claim 2 wherein said means for storing includes a bulk store and a working store;

means for reading said coded data from said bulk store into said working store; and means for connecting said working store to said first logic means and to said hyphenation logic means to provide said control and textual codes thereto.

4. The word processing system of claim 3 wherein said working store is a recirculating memory and said bulk store is at least one magnetic card.

5. The word processing system of claim 4 wherein said recirculating memory is a shift register.

6. The word processing system of claim 1 wherein said means for storing includes a bulk store and working store;

means for reading said coded data from said bulk store into said working store; and means for connecting said working store to said first logic means to provide said control and textual codes thereto.

7. The word processing system of claim 6 further wherein said working store is a recirculating memory and said bulk store is at least one magnetic card.

8. The word processing system of claim 7 further wherein said operator readable output means is a printer.

9. The word processing system of claim 8 including means connecting said recirculating memory to said at least one magnetic card operative, following printing out of said single particular text line, to allow said operator to record said control and textual codes in said recirculating memory onto said at least one magnetic card.

10. The word processing system of claim 9 wherein said recirculating memory is a shift register.

11. A method of pagination including the steps of:

storing control and textual codes representative of text lines, including line ending codes, in a store;

entering a desired page line count into control logic;

scanning said control and textual codes in said store by means of said control logic to count said line ending codes;

comparing said count of said line ending codes with said desired page line count; and visually presenting to an operator for a pagination decision a single particular text line, the line count of said single particular text line corresponding to said desired page line count, provided said visually presented line is neither the next to last line of a paragraph nor the first line of a paragraph.

* * * * *